July 26, 1966 R. A. WIESEMANN ETAL 3,263,081
FLUX MAPPING SYSTEM FOR MEASURING RADIATION
Filed April 18, 1962 4 Sheets-Sheet 1

WITNESSES
INVENTORS
Robert A. Wiesemann &
Stanley N. Ehrenpreis
BY
ATTORNEY

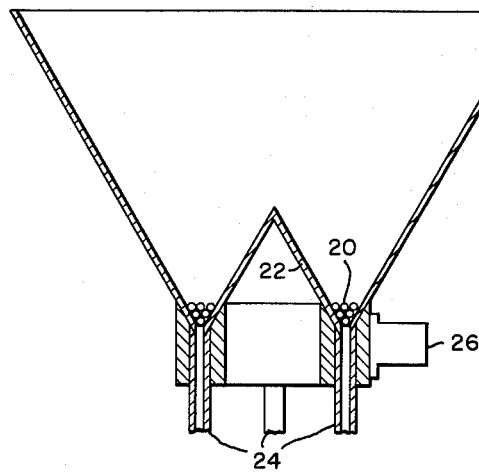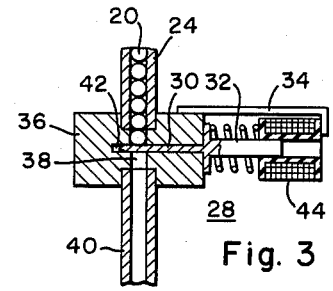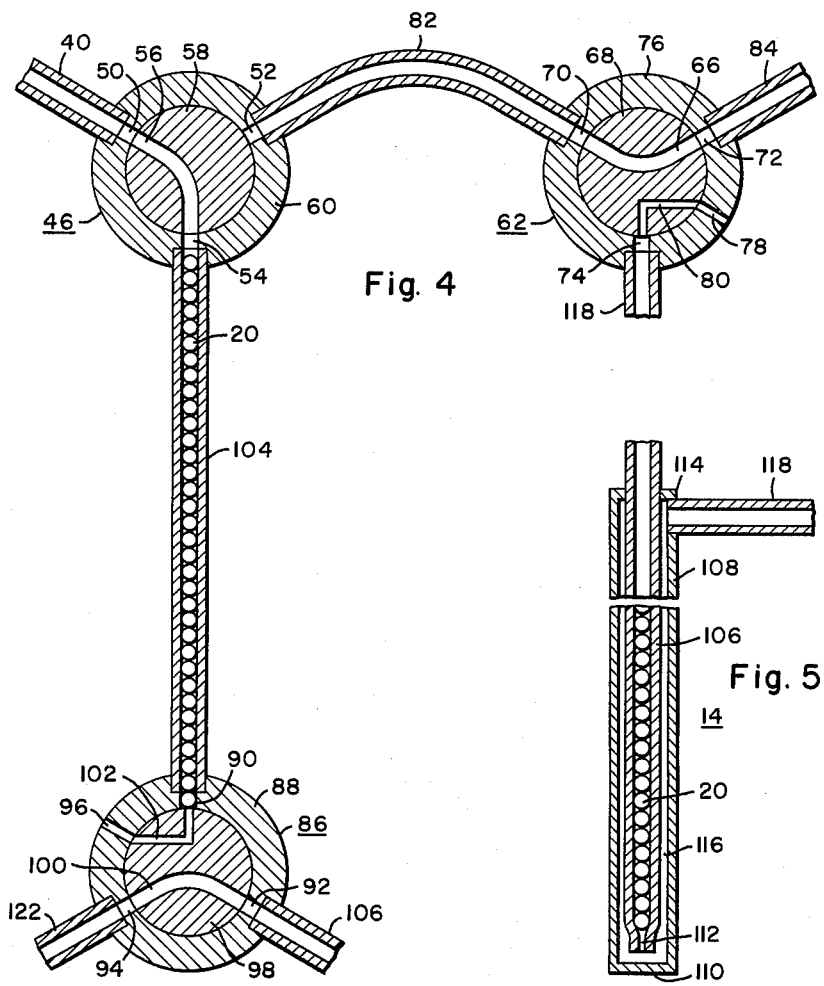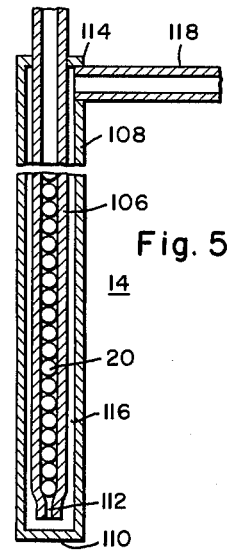
Fig. 2
Fig. 3
Fig. 4
Fig. 5

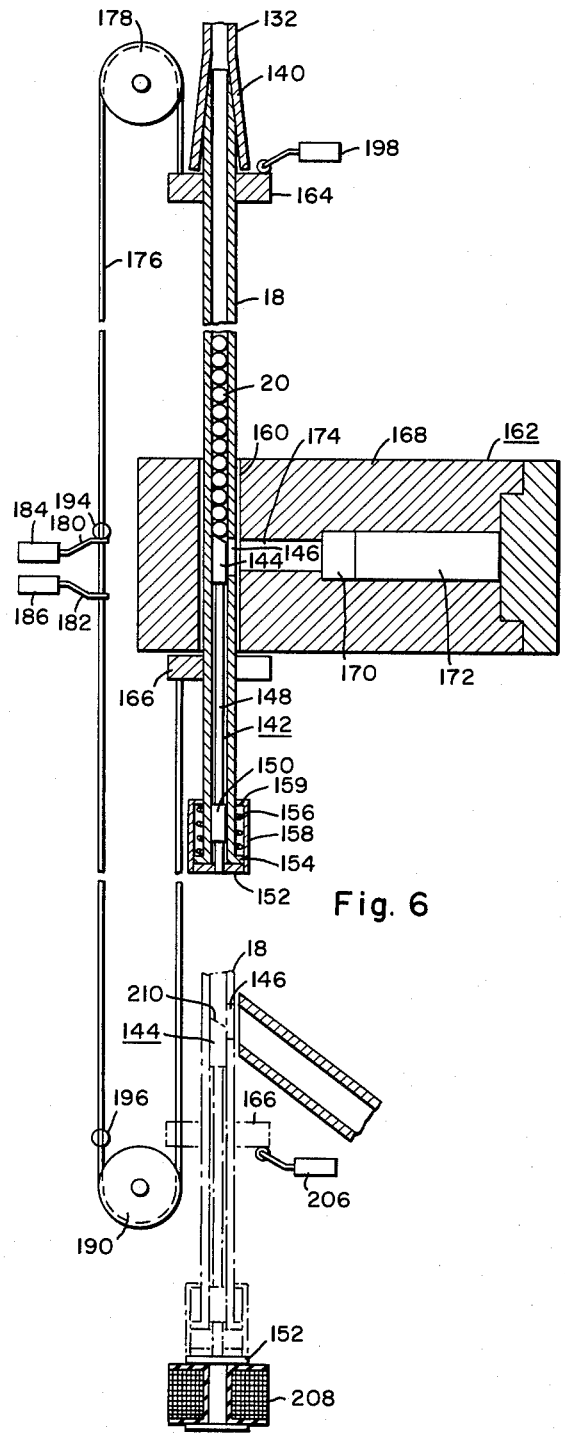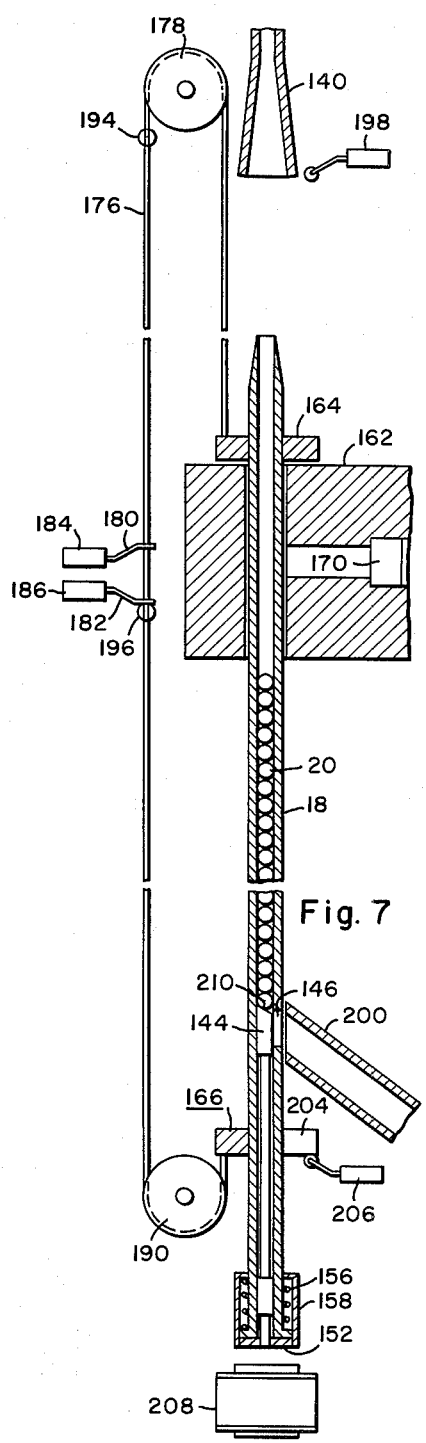

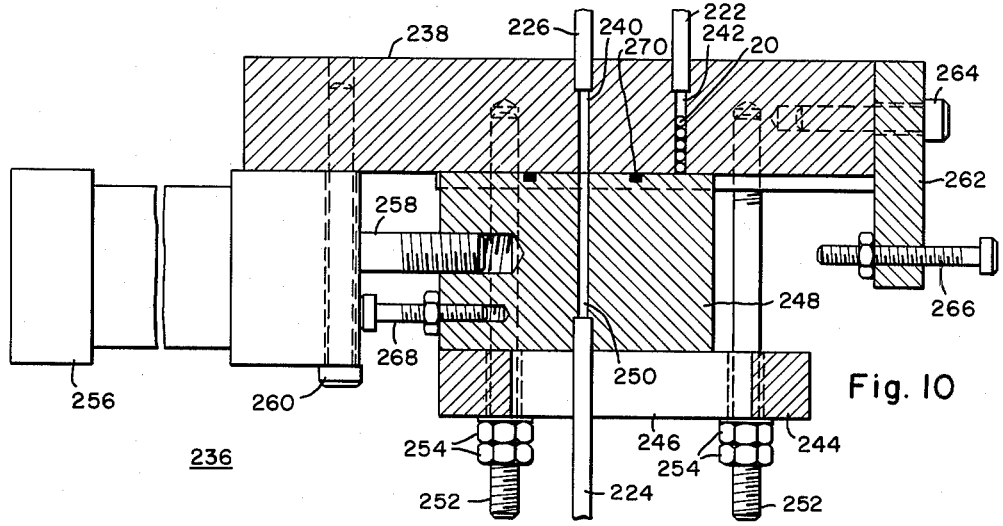
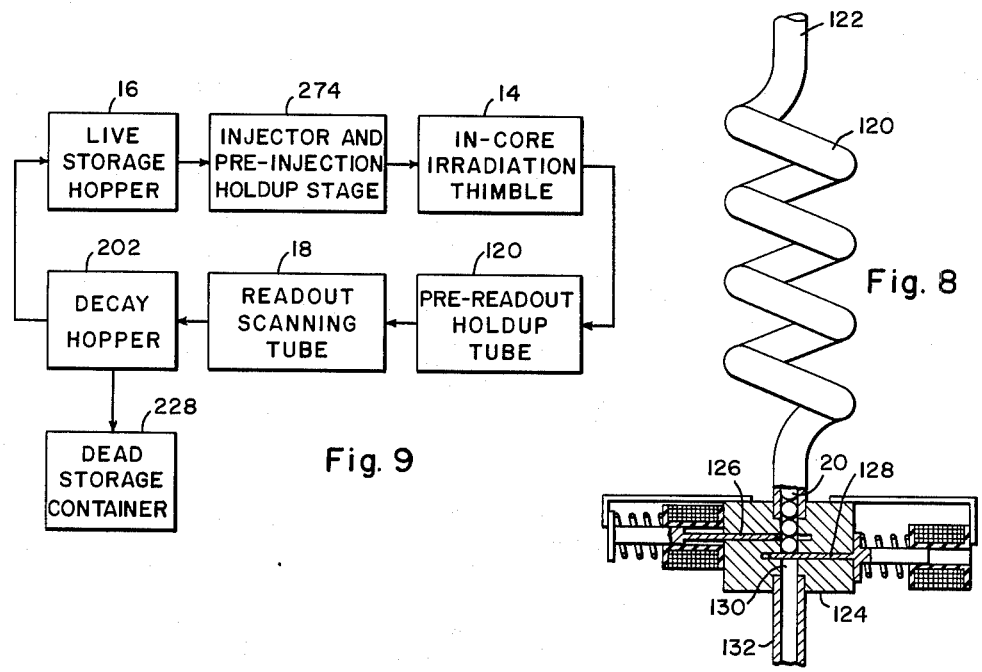

United States Patent Office 3,263,081
Patented July 26, 1966

3,263,081
FLUX MAPPING SYSTEM FOR MEASURING RADIATION
Robert A. Wiesemann, Monroeville, and Stanley N. Ehrenpreis, White Oak Boro, Pa., assignors to Westinghouse Electric Corporation, East Pittsburgh, Pa., a corporation of Pennsylvania
Filed Apr. 18, 1962, Ser. No. 188,417
22 Claims. (Cl. 250—83.3)

This invention relates in general to a flux measuring system for a neutronic reactor and more particularly to a flux measuring system which utilizes a column of balls or other suitably shaped pellets or particles.

Many reactors presently in operation utilize the so-called flux wire technique to measure flux distributions within the reactor core. Although this type of measurement produces useful information, many problems have been encountered. The flux wire system utilizes a length of wire to be radiated or activated within the reactor core. This length of wire is attached to the end of a drive cable, which is a specially constructed wire cable. The flux wire and the drive cable slide inside a conduit, which extends from inside the reactor core to its associated wire drive mechanism. The inside of the conduits must have a hard surface with a carefully controlled finish to reduce friction and to prevent the wire from hanging-up or sticking therein. In addition, where the installation requires a long distance between the drive mechanisms and the reactor core, a special Teflon lining is provided to reduce further the friction between the wire cables and the conduits. The drive cable is also very expensive and requires a very careful conduit installation so as to maintain large radius bends, a minimum number of bends, and freedom from restrictions of any kind.

Each separate flux wire also requires an individual drive unit or mechanism. These units must be capable of storing long lengths of cable without twisting, jamming, or otherwise deforming the cable. Each drive unit must have two speeds; a low speed for wire scanning and a high speed for insertion and withdrawal of the flux wires. The low speed must be constant and accurately controlled in the face of high frictional loads to permit accurate plotting of the read-out data. The high speed for insertion and withdrawal of the flux wires is also required to obtain more accurate data. This is necessary to maintain the transport time of the flux wire as short as possible in comparison to the irradiation time of the flux wire within the reactor to minimize the error in the flux reading. An accurate means of determining flux wire position is also necessary to prevent overrunning the end of the in-core thimble with resulting damage to the drive cable and/or thimble. Furthermore, an elaborate system of interlocks must be provided to prevent the insertion of two wires into a common thimble with resulting damage. Therefore, the aforementionad requirements produce a large and unwieldy installation.

Accordingly, it is the general object of this invention to provide an improved flux measuring system for various kinds of radiations.

It is a more particular object of this invention to provide a system for the detection of neutronic flux distribution within the core of a neutronic reactor.

Still another object of this invention is to provide an economical, simplified, and flexible flux mapping system.

Still another object of this invention is to provide an improved driving means for transporting the flux measuring material into and out of a reactor core.

Still another object of this invention is to provide a flux measuring system utilizing material so shaped that it can be stored, transported, and disposed of easily and is also economical to use.

Another object of this invention is to provide a flux measuring system employing material so shaped that it can be inserted and withdrawn from the reactor core with a maximum of speed and with the use of a minimum of force.

Still another object of this invention is to provide flux measuring material which can be divided into individual pellets so that each individual pellet can be monitored for its individual radioactivity or a continuous length of pellets can be monitored, whichever is desired.

Briefly, the present invention accomplishes the above cited objects by utilizing a plurality of balls or other suitably shaped pellets or particles which can be transported within a conduit. In this specification the term "pellet" is not to be restricted to a specifically or geometrically shaped object but is also intended to include objects or material having any convenient configuration or size, for example, elliptical, cylindrical, oblong, teardrop, etc. The term pellet is also intended to include, for example, a capsule containing a gas, liquid, powder or other material. The balls are made from a material such as steel, which is suitable for detecting the neutronic flux distribution within a reactor core. Other materials can be employed for fabricating or coating the balls, as dictated by the type of radiation being detected. The steel balls are contained in a "live" storage hopper, which stores balls that are ready to be irradiated. A column of steel balls is then transported by gravity and by means of a fluid, e.g., air, from the "live" storage hopper, through a conduit system, and into a thimble contained within the reactor core. First, the column of steel balls drop by gravity from the "live" storage hopper for a short distance into a conduit system. Then the column of steel balls are isolated from the "live" storage hopper and are blown by the air through the remaining portion of the conduit system into the thimble contained within the reactor core. The column of steel balls are activated within the reactor core and are then blown by the air stream out of the thimble into a conduit system, which couples the thimble to a scanning conduit where the radioactivity or other change imparted to the balls or pellets by the radiation being mapped, is measured. After the column of steel balls has entered the scanning conduit, the scanning conduit is moved past a radiation detector or counter assembly or other suitable device which is sensitive to the aforesaid change, where the activity or other change imparted to the balls is monitored. The balls are then released from the scanning conduit and conveyed to a decay hopper. In the case of radioactivity measurements, after the balls have decayed sufficiently for reuse, the balls are transported by air or other fluid from the decay hopper to the "live" storage hopper. However, if the balls are not going to be reused, they are sent to a "dead" storage container for further disposition of the balls.

Further objects and advantages of the invention will become apparent as the following description proceeds; and features of novelty, which characterize the invention, will be pointed out in particularity in the claims annexed to and forming a part of this specification.

For a better understanding of the invention, reference may be had to the accompanying drawings; in which:

FIG. 2 is a vertical sectional view of the "live" storage hopper;

FIG. 3 is a vertical sectional view of a solenoid-operated ball dispenser located a short distance below the "live" storage hopper;

FIG. 4 is a vertical sectional view of a portion of the conduit system coupling the "live" storage hopper to the thimble within the reactor core and also shows a portion of the air supply system utilized to blow the balls into or out of the thimble within the reactor core;

FIG. 5 is a vertical sectional view of a thimble within the reactor core;

FIG. 6 is an elevational view partially sectioned of a read-out scanning conduit in its uppermost position together with a counter assembly and a constant speed cable transport mechanism. Also shown in phantom is the electromagnetic ball release in its open position permitting the steel balls to drop from the scanning tube into the decay hopper;

FIG. 7 is an elevational view partially sectioned of a read-out scanning tube in its lowermost position with a counter assembly and constant speed cable transport mechanism;

FIG. 8 is a partially sectioned elevational view of a pre-readout holdup coil and its associated ball dispenser located above the readout scanning tube;

FIG. 9 is a block diagram of the aero-ball flux measuring system; and,

FIG. 10 is a partially sectioned elevation view of a sliding type three-way valve in lieu of the standard rotary type three way valve.

Figure 1:
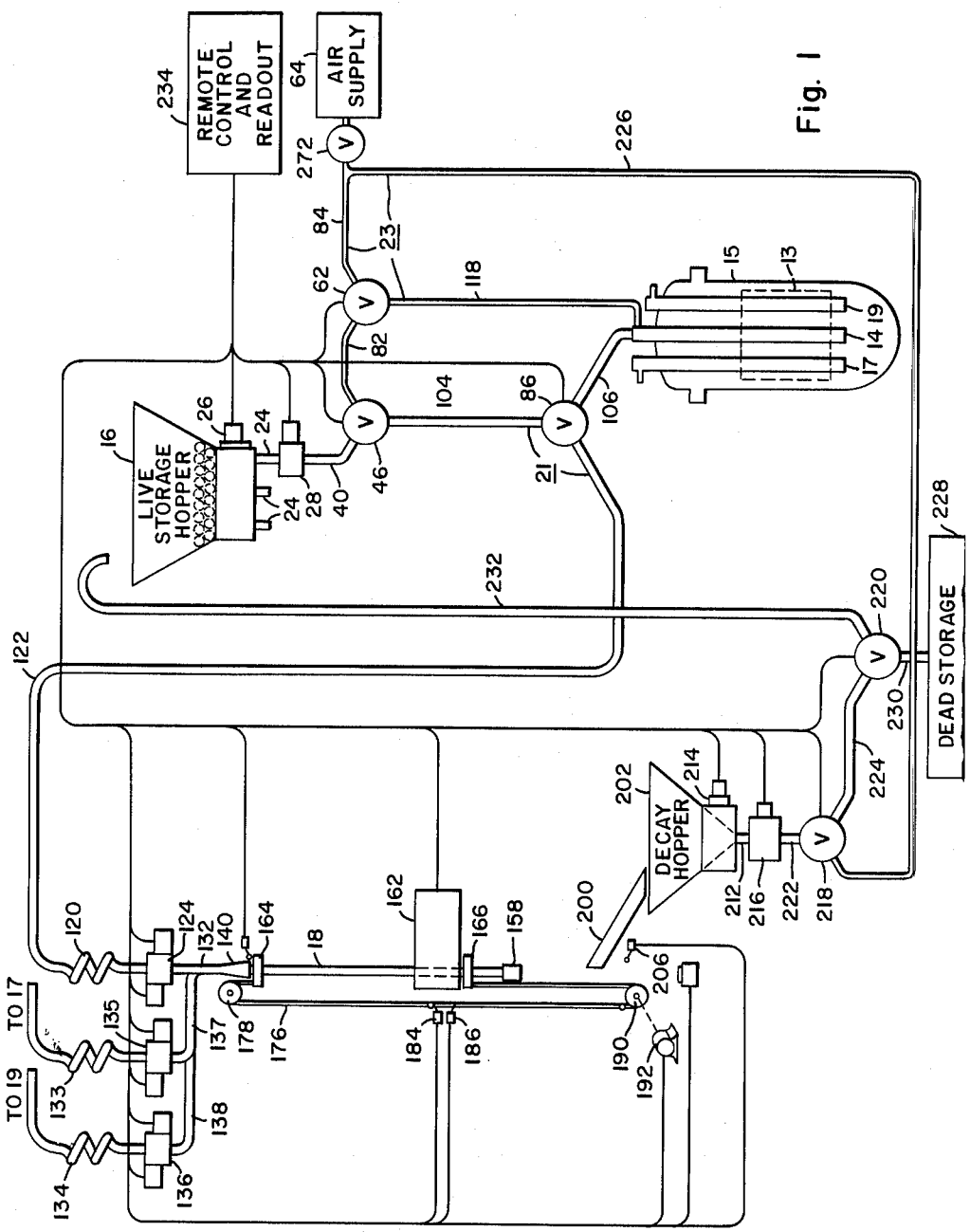
FIGURE 1 is a schematic diagram of the aero-ball flux mapping system.

Referring now to FIG. 1 of the drawings, an illustrative example of the invention as related to an aero-ball flux measuring system is depicted therein. FIG. 1 also shows the relative locations of the different components with respect to each other. Also, with reference to FIG. 1, the solid single line represents electrical circuitry, the closely spaced double line represents a conduit tube conveying a fluid such as air, and the more widely spaced double line represents a conduit tube conveying balls or a combination of balls and fluid. A plurality of in-core irradiation thimbles 14 extend into a reactor core 13 of a reactor 15. In this example a separate, valved, ball conduit system 21 is utilized to couple each of three thimbles 14, 17, and 19 to both a "live" storage hopper 16 and to a readout scanning conduit or tube 18. However, more or less than three thimbles can be installed in the reactor core 13. Thus, with the three in-core thimbles 14, 17, and 19 there will also be three separate conduit systems. A separate, valved, fluid conduit system 23 is also used to supply air to each of the in-core thimbles 14 or to the ball conduit system 21 utilized for transporting the balls within the conduits. Although, in this example of the invention, separate conduit systems 21 and 23 are used for each thimble 14, only one "live" storage hopper 16 and only one readout scanning tube 18 is used for the entire aeroball flux mapping system to be described hereinafter. Alternatively one "live" storage hopper 16 and one scanning tube 18 can be used for each conduit system 21 or 23. Also, one ball conduit system 21 can couple the hopper 16 to any one of the three thimbles 14, 17, or 19 with the use of three way valves.

Referring now to FIG. 2, a plurality of pellets or balls 20 are stored in the "live" storage hopper 16. In this example of the invention, the balls are $\frac{1}{16}$ of an inch in diameter and are made of carbon steel. The material used for the balls 20 depends on the degree of reactor power and the type of radiation to be measured. The hopper 16 has a frusto-conical shape with the smaller end at the bottom of the hopper 16. The bottom of the hopper 16 is conically shaped as indicated by reference character 22. A pulrality of discharge conduits or tubes 24 are coupled to the annular bottom of the hopper 16, so as to permit the balls 20 inside the hopper 16 to drop into the tubes 24. A vibrator 26 is also attached to the bottom of hopper 16 so as to vibrate the hopper 16, if the need arises to cause the balls 20 to drop from the hopper into the tubes 24.

Referring now to FIG. 3 of the drawings, a ball dispenser 28 is installed in each discharge tube 24 a short distance below the hopper 16. The ball dispenser 28 is solenoid-operated and has a single plunger 30. The plunger 30 is pin-shaped and extends longitudinally from an armature 32. A bracket 34 holds a solenoid portion 44 of the ball dispenser 28 in place.

The ball dispenser 28 has a rectangular block 36 with a hole 38 drilled through the block 36. The hole 38 is also countersunk so as to receive discharge tube 24 and a ball tube 40. Both tubes 24 and 40 are sealably secured to the block 36. Another hole 42 is partially drilled through the block 36 at a right angle direction to the direction of the hole 38. The hole 42 passes through the hole 38 and permits the plunger 30 to move in and out of hole 38 upon the actuation of the solenoid portion 44 of the ball dispenser 28. The plunger 30 thus allows the passage of the balls 20 from the hopper 16 through the ball dispenser 28 upon retraction of the plunger 30 from the hole 38. Conversely, the passage of the balls 20 is stopped when the plunger 30 is inserted through the hole 38.

Referring now to FIG. 4, a three-way, rotary valve 46 is positioned below the ball dispenser 28. The valve 46 is a standard, three-way valve having ports 50, 52 and 54. The ball tube 40 couples the ball dispenser 28 to the port 50 in the three-way valve 46. A passage 56 with its ends 120° apart, is formed in a rotary portion 58 of the three-way valve 46, so that any two of the three ports contained in a stationary body 60 of the three-way valve 46 may be coupled at any one time.

An air valve 62, similar in construction to the three-way valve 46, is located between the three-way valve 46 and an air supply 64 (FIG. 1). The air valve 62 has a main passage 66 formed in a rotary portion 68. The air valve 62 also has ports 70, 72, and 74 in a stationary body 76 of the valve 62. A radial vent hole 78 is also formed in the body 76. In addition, a vent passage 80 is formed in the rotary portion 68 in such a fashion that port 74 can be coupled to the vent hole 78 as shown in FIG. 4. Port 52 in valve 46 is coupled to port 70 in valve 62 by an air tube 82. Port 72 in valve 62 is coupled to the air supply 64 (FIG. 1) by an air tube 84.

A three-way rotary valve 86, having a similar construction to the air valve 62, is located below the three-way valve 46 at a distance at least equal to the height of the reactor core 13 (FIG. 1) in the reactor 15. In a stationary body 88 of the three-way valve 86, are formed ports 90, 92, and 94 and a vent hole 96. In a rotary portion 98 of the three-way valve 86 is formed a main passage 100 and a vent passage 102. The vent passage 102 is formed in such a manner that it couples port 90 to the vent hole 96 as shown in FIG. 4. Port 54 in three-way valve 46 is coupled to port 90 in valve 86 by a ball tube 104.

Referring now to FIG. 5, the in-core irradiation thimble 14 is shown having coaxial conduits comprising an inner tube 106 and an outer tube 108. The thimble 14 extends from a short distance above the reactor downwardly through the entire reactor core 13 (FIG. 1) in the reactor 15. Therefore, a column of balls 20 can be contained within the thimble 14 so as to extend over the entire length of the reactor core. The outer tube 108 extends vertically through the reactor 15 over the same length as previously described for the thimble 14. The bottom of the outer tube 108 is sealed by a circular end plate 110. The inner tube 106 extends upwardly from near the bottom of the outer tube 108 to the three-way valve 86 and is coupled to the port 92 of the valve 86. The bottom of the inner tube 106 is reduced in diameter so as to reduce also a central opening 112 into the inner tube 106. This prevents the balls 20 from dropping out of the bottom of the inner tube 106. The top of the outer tube 108 is sealed by a circular end plate 114 which has an opening through which the inner tube 106 sealably passes. The end plate 114 is sealably secured to both the top of the outer tube 108 and to the outer periphery of the inner tube 106. An annular opening 116 is formed along the entire length of the thimble 14 between the inner tube 106 and the outer tube 108, as the tubes 106 and 108 are coaxially located. An air tube 118 passes through the top of the outer tube 108 and is sealably secured to the outer tube 108. The air tube 118 couples the annular opening 116 in the thimble 14 to the port 74 in the air valve 62.

Referring now to FIG. 8, a coiled holdup tube 120 is shown. The holdup tube 120 is located above the readout scanning tube 18 to be described hereinafter. The top of the holdup tube 120 is coupled to the port 94 in three-way valve 86 by a ball tube 122. Coupled to the bottom of the holdup tube 120 is double plunger ball dispenser 124. The ball dispenser 124 has two plungers 126 and 128 and a hole 130. The plungers 126 and 128 are solenoid operated in a similar manner to that previously described for the ball dispenser 28; however, the plungers 126 and 128 are located 180° apart with both plungers passing through the hole 130. Either plunger 126 or 128 can be used to prevent or control the passage of the balls 20 through the hole 130. The balls 120 can also be controlled to pass through the ball dispenser 124 one at a time. This is accomplished by withdrawing the plunger 126 from the hole 130 with the plunger 128 in the inserted position in the hole 130. A ball 20 then drops onto the plunger 128 and is stopped by the plunger 128. The plunger 126 is then inserted into the hole 130 so as to trap the ball 20 between the plungers 126 and 128. The plunger 128 is then withdrawn from the hole 130 and allows the ball 20 to drop through the hole 130 into the readout scanning tube 18 to be described hereinafter. Coupled to the hole 130 is a ball tube 132 which extends downwardly from the ball dispenser 124. As shown in FIG. 1, other holdup tubes 133 and 134 and other ball dispensers 135 and 136 are coupled to their associated thimbles 17 and 19 within the reactor 15 in the same manner as previously described for the holdup tube 120 and the ball dispenser 124. The ball dispensers 135 and 136 are then coupled to ball tube 132 by ball tubes 137 and 138.

Referring now to FIG. 6, the ball tube 132 has formed at its bottom an alignment cone 140. The alignment cone 140 receives a tapered portion of the readout scanning tube 18, when the scanning tube 18 is in its uppermost position. The alignment cone 140 aligns the scanning tube 18, so that the balls 20 can pass from the ball tube 132 into the scanning tube 18. The scanning tube 18 is made sufficiently long to receive all of the balls 20 that were contained within the thimble 14 and also to house a ball release device 142 at the lower end of the scanning tube 18. The ball release device 142 has a ball stop 144 at the top of the ball release device 142. The ball stop 144, when in its fully inserted position as shown in FIG. 6, is located opposite an opening 146 in the scanning tube 18. The ball stop 144 blocks the opening 146 so as to prevent any of the balls 20 from passing through the opening 146. The top of the ball stop 144 is cut on an angle so as to cause the balls 20 to pass through the opening 146, whenever the ball stop 144 has been lowered so as to assume a position below the opening 146, as shown in the phantom section at the bottom of FIG. 6. The ball stop 144 is secured to the top of a ball release rod 148. A guide 150 is secured to the lower portion of the ball release rod 148. The guide 150 slides over the inner surface of the scanning tube 18 and guides the vertical movement of the ball release device 142. A ball release disc 152 is secured to the bottom of the ball release rod 148. The disc 152 is spring biased against a lip 154 formed at the bottom of the scanning tube 18 by a spring 156. The spring 156 is contained within a housing 158. The bottom of the housing 158 is secured to the outer periphery of the disc 152. A lip 159 is formed at the top of the housing 158, so as to move slidably over the outer surface of the scanning tube 18 and to compress the spring 156, when the ball release disc 152 is moved in a downward direction away from the lip 154 on the scanning tube 18.

The porton of the vertically positioned scanning tube 18, which passes through an opening 160 in a counter assembly 162 is that part from an upper annular disc 164, which is secured to the upper portion of the scanning tube 18, to a lower annular disc 166, which is secured to the lower portion of the scanning tube 18 only a short distance above the housing 158. The counter assembly 162 comprises a cylindrical lead shield 168, a scintillation crystal 170 and a photomultiplier 172. The crystal 170 and the photomultiplier 172 are contained within the lead shield 168, and an axial opening 174 is formed within the lead shield 168. The opening 174 also permits the crystal 170 to measure the radioactivity being radiated by the balls 20, as the scanning tube 18 is lowered through the opening 160 in the lead shield 168.

One end of a drive cable 176 is then secured to the upper disc 164. The drive cable 176 is then passed over an idler pulley 178, which is positioned opposite the alignment cone 140. The drive cable 176 then slidably passes through an arm 180 on an upper scanning limit switch 184 and an arm 182 on a lower scanning limit switch 186. The drive cable 176 is then passed around a drive pulley 190, and then the other end of the drive cable 176 is secured to the lower disc 166. A positioning motor 192 (FIG. 1) is coupled to the drive pulley 190. The motor 192 is a constant speed motor, which drives the cable transport mechanism previously described. An upper stop 194 is secured to the drive cable 176 at a position so that when the scanning tube 18 is in its uppermost position, the upper stop 194 strikes the arm 180 which in turn causes the upper scanning limit switch 184 to stop the operation of the counter assembly 162. A lower stop 196 is secured to the drive cable 176 at a position so that when the scanning tube 18 is in its lowermost position, as shown in FIG. 7, the lower stop 196 strikes the arm 182 which in turn causes the lower scanning limit switch 186 to to stop the operation of the counter tube 162. In addition, when the scanning tube 18 is in its uppermost position, the upper annular disc 164 trips a ball loading limit switch 198 which in turn stops the upward movement of the scanning tube 18 and also actuates one of the ball dispensers 124, 135 or 136 (FIG. 1) so as to load the balls 20 from one of the associated holdup tubes 120, 133 or 134 (FIG. 1) into the scanning tube 18.

Referring now to FIG. 7, the readout scanning tube 18 is shown in the lowermost position, after it has been lowered through the opening 160 in the counter assembly 162. With the scanning tube 18 in its lowermost position, the opening 146 is opposite one end of a ball tube 200, which is used to convey the balls 20 from the scanning tube 18 to a decay hopper 202 (FIG. 1). A section of the lower annular disc 166 has been cut away, as indicated by a reference character 204. The cut-away section 104 is sufficiently large to permit the lower disc 166 to pass by the ball tube 200 as the scanning tube 18 is lowered. The remaining portion of the lower disc 166 actuates a ball release limit switch 206, which stops the downward movement of the scanning tube 18 and actuates an electromagnet 208. The electromagnet 208 attracts the ball release disc 152 against the electromagnet 208 as shown in the phantom view in FIG. 6. This movement compresses the spring 156 and moves the ball stop 144 below the opening 146 in the scanning tube 18. A bevel 210 at the top of the ball stop 144 then comes into alignment with the bottom of the inner surface of the ball tube 200 so as to permit the balls 20 to roll freely from the scanning tube 18 into and through the ball tube 200 into the decay hopper 202 (FIG. 1). After all the balls 20 have rolled out of the scanning tube 18, the electromagnet 208 is deenergized and the ball stop 144 returns to its original position blocking the opening 146 by means of the spring biasing of the spring 156 previously described.

Referring now to FIG. 1 of the drawings, the decay hopper 202 has an inverted cone-shape with one discharge tube 212. A vibrator 214 is secured to the bottom of the decay hopper 202 and is used in the same manner as the previously described vibrator 26. A ball dispenser 216, a three-way valve 218, and a three-way valve 220 are similar to the ball dispenser 28, the three-way valve 46, and the three-way valve 86 respectively. A ball tube 222 couples the ball dispenser 216 to a first port of the three-way valve 218. A ball tube 224 couples a second port and a first port of the three-way valves 218 and 220 respectively. The third port of the three-way valve 218 is coupled to the air supply 64 by an air tube 226. A second port of the three-way valve 220 is coupled to a dead storage container 228 by a ball tube 230. A third port of the three-way valve 220 is coupled to a ball tube 232, which discharges into the "live" storage hopper 16.

A remote control and readout unit 234 is electrically connected to many of the previously described components as shown by the single solid line drawn from the remote control unit 234 to the various components. The unit 234 remotely controls all of the various components to which it is directed and also receives a reading from the counter assembly 162.

Referring now to FIG. 10 of the drawings, there is shown a sliding type three-way valve 236, which can be used in place of the rotary type three-way valves previously described. At the top of the valve 236 is a rectangularly shaped top plate 238. At the bottom of the valve 236, there is located a bottom rectangularly shaped plate 244. Drilled through the top plate 238 are ports 240 and 242. At the center of the bottom plate 244, there is formed a slotted opening 246. The slotted opening 246 permits tubing which passes through the bottom plate 244 to move back and forth freely within the bottom plate 244. Slidably positioned between the upper plate 238 and the bottom plate 244 is a block type slide 248, which has a port 250 drilled vertically through the slide 248. The port 250 is alignable with either the port 240 or the port 242. The top plate 238, the bottom plate 244 and the slide 248 are held together by studs 252 and nuts 254. An air actuator 256 is secured to one end of the top plate 238 by a cap screw 260. The air actuator 256 has a reciprocating rod 258, which has one end secured to the slide 248. An end plate 262 is secured to the other end of the top plate 238 with cap screws 264. An adjustable stop 266 is threaded through the lower portion of the end plate 262. The stop 266 is adjusted so that when it contacts the slide 248, the port 250 will be in alignment with the port 242. Another adjustable stop 268 is threaded into the slide 248 and is so set that when the stop 268 comes in contact with the air actuator 246, the port 250 will be in alignment with the port 240.

Upon the actuation of the air actuator 256 the rod 258 is forced out of the actuator 256 thereby forcing the slide 248 to move against the stop 266 with a resulting alignment between port 250 and port 242. When the actuator 256 is again operated, the rod 258 is withdrawn into the actuator 256 and causes the slide 248 to move toward the actuator 256 until the stop 268 comes in contact with the actuator 256 resulting in the alignment of the port 250 with the port 240. An O-ring 270 is positioned at the top of the slide 248 around the port 250. The O-ring 270 forms a seal so as to prevent the leakage of air between the top plate 238 and the slide 248 whenever air pressure is applied to the port 250.

An example of how the sliding type three-way valve 236 can replace any of the rotary type three-way valves previously described follows. In this example, valve 236 will be used to replace valve 218. The air tube 226, the ball tube 222, and the ball tube 224 are sealably secured to the ports 240, 242, and 250, respectively. In operation, the ball dispenser 216 is opened which allows the balls 20 in the decay hopper 202 to pass into the ball tube 222 and come to rest against the top of the slide 248 as shown in FIG. 10. The ball dispenser 216 is then closed.

The air actuator 256 is then operated so as to force the slide 248 against the stop 266, thereby aligning ports 250 with port 242. This permits the balls 20 to pass from the ball tube 222 into the ball tube 224, until the balls 20 reach the valve 220. After all the balls have passed from the ball tube 222 into the ball tube 224, the air actuator 256 is operated so as to move the slide 248 towards the actuator 256 until the stop 268 comes in contact with the actuator 256, thereby aligning port 250 with port 240. This permits air pressure to come to bear on the balls 20 which are in the ball tube 224. The valve 220 is then positioned so as to permit the balls 20 to pass through the ball tube 232 into the "live" storage hopper 16 or to pass through the ball tube 230 into the dead storage container 228. The tubing 224 is sufficiently flexible so that the movement it makes within the slotted opening 246 in the bottom plate 244 cannot cause the tube 224 to rupture or to become separated from the port 250.

Referring now to FIG. 9 of the drawings, there is shown a block diagram of the individual steps which comprise the aero-ball flux mapping system. The balls are initially stored in the "live" storage hopper 16. The length of the column of balls to be inserted into the reactor is then determined in the injector and pre-injection holdup stage. The balls are then injected into the in-core irradiation thimble 14, which is contained within the reactor. After the balls have been irradiated, the balls are forced out of the in-core thimble 14 and transported to the pre-readout holdup tube 120. Each in-core thimble 14, 17, and 19 has its own associated pre-readout holdup tube 120, 133, and 134 respectively. The balls are then fed from each pre-readout holdup tube in their proper sequence into the readout scanning tube. The balls are then monitored for their activity by the readout scanning tube 18. From the readout scanning tube 18, the balls are transported to the decay hopper 202. After the balls have decayed sufficiently for use, the balls are transported back to the "live" storage hopper 16 for reuse or to the dead storage container 228 if the balls are not to be reused.

OPERATION OF AERO-BALL SYSTEM

Referring now to FIG. 1 of the drawings an operational explanation of the aero-ball flux mapping system will be given. The balls 20 (FIG. 2) are initially loaded into the "live" storage hopper 16. The hopper 16 funnels the balls by gravity and with the aid of a small vibrator 26 into the discharge tubes 24. The balls 20 (FIG. 3) are now ready to proceed into the injector and pre-injection holdup stage 274 (FIG. 9) which comprises all components shown in FIG. 4. The single plunger ball dispenser 28 is opened permitting the balls 20, FIG. 3, to pass into the ball tube 40 by gravity to the valve 86 at which point the movement of the balls 20 is stopped. It is seen in FIG. 4 that as the balls 20 roll from ball tube 40 into ball tube 104, the balls 20 will force any air that is entrapped within ball tube 104 out through the vent passage 102 and the vent hole 96 so as to permit the balls 20 to reach the three-way valve 86. After the ball tubes 40 and 104 have been filled with balls 20, the ball dispenser 28 is closed so as to prevent any additional balls 20 from passing from the hopper 16 into the ball tubes 40 and 104. The number of balls 20 to be inserted into the thimble 14 is determined by the length of the ball tubes 40 and 104 between the ball dispenser 28 and the three way valve 86. The three-way valve 86 is now positioned so as to couple the ball tube 104 to the ball tube 106. At this point, the balls will roll by gravity from the ball tubes 40 and 104 into the ball tube 106.

After the balls 20 have passed valve 46, valve 46 is operated so as to couple air tube 82 to the ball tube 104. Previously a stop valve 272 had been opened, and valve 62 has been positioned to couple air tube 82 to air tube 84. Air pressure from air supply 64 now acts on the balls 20 (FIG. 4) in ball tube 104. Pressurized air then blows or forces the balls 20 (FIG. 4) to the bottom of the inner tube 106 as shown in FIG. 5. The stop valve 272 is then shut off to reduce the air pressure on the balls 20 within the thimble 14. The balls 20 remain in the thimble 14, which is within the reactor core (not shown), for a predetermined length of time. At the end of this time, the valve 86 is operated so as to couple inner tube 106 to the ball tube 122. Then the air valve 62 is operated so as to couple the air tube 84 to the air tube 118. Stop valve 272 is then opened allowing the pressurized air from air supply 64 to transport or force the balls 20 out of the thimble 14. As more clearly shown in FIG. 5, the pressurized air enters the annular opening 116 from the air tube 118. The air flows downwardly to the bottom of the annular opening 116. At this point, the air flow reverses and flows through the central opening 112 at the bottom of the inner tube 106. The pressurized air then forces the balls 20 through the inner tube 106, through the three-way valve 86, through the ball tube 122, and into the holdup tube 120. The movement of the balls 20 is then stopped by the plunger 128 in the ball dispenser 124, as shown more clearly in FIG. 8.

Referring now to FIG. 1 and with particularity to FIGS. 6 and 8 of the drawings, the readout scanning tube 18 is shown in its uppermost position so as to permit the ball tube 132 to couple the double plunger ball dispenser 124 (FIG. 8) to the readout scanning tube 18. The ball dispenser 124 can be operated to allow a multiple number of balls 20 or only a single ball 20 to drop by gravity from the holdup tube 120 into the scanning tube 18 so as to permit a plurality of balls 20 or a single ball 20 to be monitored, whichever is the most desirable. All balls 20 in the holdup tube 120 can be allowed to enter the scanning tube 18 simply by opening the plunger 128 of the ball dispenser 124. However, if only a single ball is desired to be monitored in the scanning tube 18, then such single ball 20 is isolated from the remaining balls 20 by the insertion of plunger 126. Thus, a single ball 20 is entrapped between plungers 126 and 128. Plunger 128 is then withdrawn from the hole 130, so as to permit the entrapped ball 20 to drop by gravity into the scanning tube 18. The plunger 128 is then reinserted into hole 130 and the plunger 126 is next withdrawn from the hole 130. The balls 20 then drop onto the plunger 128, and the previously described procedure can be repeated in order to isolate another ball 20.

Referring now to FIG. 6 of the drawings, the balls 20 fall by gravity through the scanning tube 18 until they reach the top of the ball stop 144 at which point the balls 20 come to rest. The scanning tube 18 is then moved downwardly at a constant speed through the opening 116 in the counter assembly 162 by the drive cable 176. The cable 176 is driven by the drive pulley 190, which in turn is coupled to the position motor 192 (FIG. 1). The activity of the balls 20 is read and monitored remotely by the counter assembly 162 as the scanning tube 18 is lowered through the opening 160 in the counter assembly 162. As the scanning tube 18 is lowered, the ball tube 200 is pivoted a slight amount to permit the housing 158 at the bottom of the scanning tube 18 to proceed by the ball tube 200. After the housing 158 has proceeded past the ball tube 200, the ball tube 200 is rotated back to its original position as shown in FIGS. 1 and 7.

Referring now to FIG. 7 of the drawings, the scanning tube 18 is shown in its lowermost position with all the balls 20 having passed through the counter assembly 162. When the scanning tube 18 is at its lowermost position, the lower stop 196, which is secured to the drive cable 176, actuates the lower scanning limit switch 186 by coming in contact with the arm 182 so as to stop the operation of the counter assembly 162. In addition, the lower annular disc 166 actuates the ball release limit switch 206 so as to energize the electromagnet 208. As previously described, the electromagnet 208 when energized causes the ball stop 144 to be lowered so as to uncover the opening 146 in the scanning tube 18 as shown in the phantom portion of FIG. 6. The balls 20 then drop by gravity from the scanning tube 18, through the opening 146, through the ball tube 200, and into the decay hopper 202 (FIG. 1). After all the balls 20 have rolled out of the scanning tube 18, the electromagnet is deenergized. The ball stop 144 then returns to its original position, as it is spring-biased by spring 156 in an inserted position covering the opening 146. The scanning tube 18 is then returned to its original position within the alignment cone 140 as shown in FIG. 6, by the drive cable 176. When the scanning tube 18 has reached its uppermost position as shown in FIG. 6, the upper stop 194 actuates the upper scanning limit switch 184 by coming in contact with the arm 180 so as to stop the operation of the scanning tube 162. It is to be noted that the counter assembly 162 is always in operation unless said operation is stopped by either the upper stop 194 or the lower stop 196 actuating the upper limit switch 184 or the lower limit switch 186, respectively, as previously described. The scanning tube 18, when it has returned to its uppermost position, is then ready to receive another column of balls from another holdup tube such as 133 or 134 (FIG. 1). The aforementioned procedure is then repeated for each group of balls 20 that have been activated at different locations within the reactor 15 (FIG. 1). If it is desirable, a separate scanning tube 18 and a separate counter assembly 162 can be installed for each ball conduit system 21 (FIG. 1).

Returning now to FIG. 1 of the drawings, the balls 20 are kept in the decay hopper 202 until the balls 20 have decayed sufficiently for reuse. The balls 20 then pass from the decay hopper 202, through the discharge tube 212, through the ball dispenser 216, through the ball tube 222, through the three-way valve 218, and through the ball tube 224 to the three-way valve 220 in the same manner as previously described for the balls 20 going from the "live" storage hopper 16 to the three-way valve 86. The valve 220 can then be set so as to couple the ball tube 224 to the ball tube 230. The balls 20 can then pass from the ball tube 224 through the three-way valve 220 and into the dead storage container 228, if the balls are not going to be reused. However, if the balls 20 are going to be reused, the valve 220 is set so as to couple the ball tube 224 to the ball tube 232. The valve 218 is then operated so as to couple the air tube 226 to the ball tube 224. Pressurized air from the air supply 64 is then permitted to flow through the air tube 226, through the three-way valve 218, and into the ball tube 224. The pressurized air then forces the balls 20 in the ball tube 224 to pass through the valve 220 and vertically upwardly through the ball tube 232. The balls 20 are then discharged into the "live" storage hopper 16. The "live" storage hopper 16 then funnels the balls 20 into the discharge tubes 24. Thus the balls 20 are again ready to be inserted into the thimble 14 within the reactor 15, as previously described in this specification.

In this example of the invention, the ball tubes are made of stainless steel and have an internal diameter of 0.075 inch, but can be made of other metals. The balls have a $\frac{1}{16}$ inch diameter and can be made of carbon steel. The air tubing can be made of steel, aluminum or some other metal or plastic.

It will, therefore, be apparent that there has been disclosed an aero-ball system which permits flux mapping within a reactor. This system is flexible, economical and speedy.

While there have been shown and described what are at present considered to be the preferred embodiments of the invention, modifications thereto will readily occur to those skilled in the art. For example, the sequence of valve operations can be altered, or the scanning tube can remain fixed while the counter assembly is made movable so that the counter assembly moves over the scanning tube to determine the activation of the balls within the scanning tube. For example, the counter assembly can be mounted on a trunnion so as to be rotatable. The scanning tube can then be circular in shape and held in a fixed position with the counter assembly mounted at the center of the scanning tube. The counter assembly is then rotated within the circular scanning tube at a constant speed to determine the activation of the balls within the scanning tube.

In certain applications only one ball need be used in an individual ball conduit system. Thus, a single ball can be used to measure flux at a given point or location within a radiation area rather than for mapping purposes.

In addition, the ball type system previously described can be used to measure other types of particulate and electromagnetic radiations.

For example, the conduits could be transparent; and the balls could have an outer coating sensitive to light, or the balls also could be transparent and contain an embedded material which is sensitive to light. Thus the coating or embedded material could be changed proportionately by the amount of radiation seen by the ball.

It is not desired, therefore, that the invention be limited to the specific arrangements shown and described. However, it is intended to cover in the appended claims all such modifications as fall within the true spirit and scope of the invention.

Accordingly, what is claimed as new is:

1. A flux mapping system for neutronic reactor comprising a plurality of pellets of flux sensitive material, means for inserting and distributing said pellets within said reactor in a predetermined arrangement so as to be activated by said reactor, means for withdrawing said pellets from said reactor, and means for measuring in conformance with said arrangement the activation of said pellets.

2. A flux mapping system for a neutronic reactor comprising a plurality of pellets of flux measuring material, means for inserting said pellets into said reactor so as to be activated by said reactor, means for withdrawing said pellets from said reactor, and means for measuring the activation of each of said pellets separately.

3. A flux mapping system for a neutronic reactor comprising a plurality of pellets of flux sensitive material, means for determining the overall length of a column of said pellets to be inserted into said reactor, fluid means coupled to said column determining means for inserting said pellets into said reactor so as to be activated by said reactor, fluid means for withdrawing said pellets from said reactor, and means for measuring the activation of said pellets.

4. A flux mapping system for measuring radiation at a given location, said system comprising a plurality of pellets fabricated with a material sensitive to said radiation, means for positioning said pellets in a predetermined array at said location so as to be exposed to said radiation, means for withdrawing said pellets from said location, and means for measuring in conformance with said array the exposure of each of said pellets.

5. A flux mapping system for measuring distributed quantities of radiation at a given location, said system comprising a plurality of pellets fabricated with a material sensitive to said radiation, fluid means for positioning said pellets in a predetermined array within said location so as to be exposed to said radiation, fluid means for withdrawing said pellets from said location, and means for measuring in conformance with said array the exposure of each of said pellets.

6. A flux mapping system for a neutronic reactor comprising conduit means extending into said reactor, a plurality of pellets for said conduit means, fluid means for transporting said pellets through said conduit means into and out of said reactor in an orderly sequence, and means for measuring in sequence the activation of said pellets by said reactor.

7. A flux mapping system for a neutronic reactor comprising conduit means extending into said reactor, a plurality of pellets for said conduit means, fluid means for transporting said pellets through said conduit means into and out of said reactor in an orderly sequence, means for measuring in said sequence the activation of said pellets by said reactor, and means for reducing the activation of said pellets and for returning said pellets to said conduit means.

8. The method of determining the flux distribution within a reactor comprising the steps of arranging a plurality of pellets in a predetermined array, transporting said pellets in said array into a reactor core so that said pellets in said reactor core conform to said array, radiating said pellets in said reactor core for a predetermined period of time, transporting said pellets from said reactor core to a radiation measuring station, and measuring the induced radiation of each of said pellets in said array.

9. The method of determining the flux distribution within a reactor comprising the steps of transporting a plurality of pellets in a predetermined order into a reactor core, radiating said pellets in said reactor core for a predetermined period of time, transporting said pellets from said reactor core to a radiation measuring station, and measuring in said order the induced radiation of each of said pellets.

10. A flux mapping system for a neutronic reactor comprising a plurality of balls, a storage hopper for storing said balls, said hopper having a plurality of discharge outlets, a stop valve for each of said outlets to control the number of said balls discharged, a plurality of thimbles extending into said reactor, each of said thimbles comprising a sealed outer tube and a coaxial inner tube, at least one scanning conduit, a valved ball conduit system coupling each of said discharge outlets to its said associated thimble inner tube and coupling each of said inner tubes to said scanning tube, a valved fluid conduit system for each of said thimbles coupled to said ball conduit system so as to force said balls through a portion of said ball conduit system into said thimble inner tube and also coupled to said thimble outer tube so as to force said balls out of said thimble inner tube through a second portion of said ball conduit system and into said scanning tube, at least one valve in each of said ball conduits to control the passage of said balls, said valve comprising a first plate having a plurality of ports formed transversely through said first plate, a second plate having a slotted opening transversely through said second plate, and a block slidably disposed between said first and said second plates, said block having a port simultaneously alignable with any one of said ports in said first plate and said slotted opening in said second plate, means for moving said block in a reciprocating manner between said first and said second plates, means at the exposed end of each port for sealably securing a conduit, and a flux measuring instrument so constructed and arranged to measure the flux radiating from said balls.

11. A valve comprising a first plate having a plurality of ports formed transversely through said first plate, a second plate having a slotted opening transversely through said second plate, and a block slidably disposed between said first and said second plates, said block having a port simultaneously alignable with any one of said ports in said first plate respectively and said slotted opening in said second plate an O-ring around said port in said block and movable with said block, said O-ring sealably contacting said first plate and said block, and a conduit extending through said slotted opening and sealably secured to the exposed end of said port in said block.

12. A valve comprising a first plate having a plurality of ports formed transversely through said first plate, a second plate having a slotted opening transversely through said second plate, and a block slidably disposed between said first and said second plates, said block having a port simultaneously alignable with any one of said ports in said first plate and said slotted opening in said second plate, means for moving said block in a reciprocating manner between said first and said second plates, means at the exposed end of each port for sealably securing a conduit thereto, and a conduit extending through said slotted opening and sealably secured to the exposed end of said port in said block, said conduit being capable of the same amount of reciprocating movement as said block.

13. A valve comprising a first plate having a port formed transversely through said first plate, a second plate having a slotted opening transversely through said second plate, and a block slidably disposed between said first and said second plates, said block having a plurality of ports with any one of said ports in said block being alignable with said port in said first plate and with said aligned port in said block being simultaneously alignable with said slotted opening in said second plate; means for holding together said first and said second plates with said block slidably disposed therebetween; means for moving and aligning said block so as to align any one of said ports in said block with said port in said first plate; and a conduit sealably secured to the exposed end of each port.

14. A flux mapping system for a neutronic reactor comprising a plurality of balls, a storage hopper for storing said balls, said hopper having a plurality of discharge outlets, a stop valve for each of said outlets to control the number of said balls discharged, a plurality of thimbles extending into said reactor, each of said thimbles comprising a sealed outer tube and a coaxial inner tube, at least one scanning conduit, a valved ball conduit system coupling each of said discharge outlets to its said associated thimble inner tube and also coupling each of said inner tubes to said scanning conduit, a valved fluid conduit system for each of said thimbles coupled to said ball conduit system so as to force said balls through a portion of said ball conduit system into said thimble inner tube and also coupled to said thimble outer tube so as to force said balls out of said thimble inner tube through a second portion of said ball conduit system and into said scanning conduit, and a flux measuring instrument so constructed and arranged to measure the flux radiating from said balls.

15. A flux mapping system for a neutronic reactor comprising a plurality of pellets of flux sensitive material, means for determining the overall length of a column of said pellets to be inserted into said reactor, fluid means coupled to said column determining means for inserting said pellets into said reactor in a predetermined arrangement so as to be activated by said reactor, fluid means for withdrawing said pellets from said reactor, and means for measuring in conformance with said arrangement the activation of said pellets.

16. A flux mapping system for a neutronic reactor comprising a plurality of pellets of flux sensitive material, at least one measuring conduit for determining the overall length of a column of said pellets to be inserted into said reactor, at least one thimble in a reactor core, said thimble being coupled to said measuring conduit, fluid means coupled to said measuring conduit for transporting said pellets into said thimble so as to be activated by said reactor core, a scanning conduit, means to couple said thimble to said scanning conduit, fluid means coupled to said thimble for transporting said pellets through said coupling means from said thimble to said scanning conduit, and a flux measuring instrument so constructed and arranged to measure the flux radiating from said pellets.

17. A flux measuring system for measuring radiation at a given remote location comprising a pellet storage position, at least one pellet, means for moving said pellet to said remote location so as to be exposed to said radiation, means for withdrawing said pellet from said remote location, an exposure measuring position, said moving means and said withdrawing means including at least one valve means having a first valve position coupling said moving means between said pellet storage position and said remote location, said valve means being movable to a second position coupling said withdrawing means between said remote location and said exposure measuring position, said valve means including a first port therein communicating with said storage position, a second port communicating with said remote location, and a third port communicating with said exposure measuring position, a first plate, said first and third ports being formed respectively in said first plate, a second plate having a slotted opening transversely through said second plate, and a block slidably disposed between said first and said second plates, said block having said second port formed therein simultaneously alignable with one of said first and third ports and said slotted opening, said block connecting said first and second ports when said block is disposed at said first position and connecting said third and second ports when said block is disposed at said second position, and means for measuring the exposure of said pellet.

18. A flux mapping system for a neutronic reactor core comprising a plurality of pellets of flux sensitive material, means for inserting and distributing said pellets within said reactor core in a predetermined arrangement so as to be activated by said reactor core, means for withdrawing said pellets from said reactor core, and means for measuring in conformance with said arrangement the activation of said pellets.

19. A flux mapping system for a neutronic reactor comprising conduit means extending into said reactor, a plurality of pellets for said conduit means, means for transporting said pellets through said conduit means into and out of said reactor in an orderly sequence, and means for measuring in said sequence the activation of said pellets by said reactor.

20. A flux mapping system for a neutronic reactor comprising a plurality of pellets of flux sensitive material, means for determining the overall length of a column of said pellets to be inserted into said reactor, means coupled to said column determining means for inserting said pellets into said reactor so as to be activated by said reactor, means for withdrawing said pellets from said reactor, and means for measuring the activation of said pellets.

21. A flux mapping system for a neutronic reactor comprising a plurality of pellets of flux sensitive material, means for determining the overall length of a column of said pellets to be inserted into said reactor, means coupled to said column determining means for inserting said pellets into said reactor in a predetermined arrangement so as to be activated by said reactor, means for withdrawing said pellets from said reactor, and means for measuring in conformance with said arrangement the activation of said pellets.

22. A flux mapping system for a neutronic reactor core comprising conduit means extending into said reactor core, a plurality of pellets for said conduit means, means for transporting said pellets through said conduit means into and out of said reactor core, said pellets forming at least one vertical column after insertion into said reactor core, and means for measuring the activation of said pellets by said reactor core.

References Cited by the Examiner
UNITED STATES PATENTS

| | | | |
|---|---|---|---|
| 2,649,289 | 8/1953 | Giberson | 222—194 |
| 2,744,199 | 5/1956 | Juterback | 250—43.5 |
| 2,750,517 | 6/1956 | Baum | 250—106 |
| 2,751,505 | 6/1956 | Anderson | 250—83.1 |

(Other references on following page)

UNITED STATES PATENTS

| | | | |
|---|---|---|---|
| 2,781,056 | 2/1957 | Caruful | 137—624 |
| 2,828,875 | 4/1958 | Ginns | 250—106 |
| 2,879,797 | 3/1959 | Guaraldi | 137—624 |
| 2,955,088 | 10/1960 | Beerbower | 252—301.1 |
| 2,969,307 | 1/1961 | Fermi | 250—83.1 |
| 3,035,173 | 5/1962 | Miramond | 250—83.1 |
| 3,052,353 | 9/1962 | Pritchett | 250—106 |

RALPH G. NILSON, *Primary Examiner.*

J. W. LAWRENCE, *Assistant Examiner.*